United States Patent [19]

Lauer, Jr.

[11] 4,149,927
[45] Apr. 17, 1979

[54] TIRE BUILDING APPARATUS WITH IMPROVED DRUM SHOULDER

[75] Inventor: Walter W. Lauer, Jr., Canton, Ohio

[73] Assignee: The General Tire & Rubber Company, Akron, Ohio

[21] Appl. No.: 889,718

[22] Filed: Mar. 24, 1978

[51] Int. Cl.² .................. B29H 17/14; B29H 17/22
[52] U.S. Cl. .................... 156/415; 156/417
[58] Field of Search ........... 156/414, 415, 416, 417, 156/418, 419, 420, 398, 132

[56] References Cited

U.S. PATENT DOCUMENTS

| | | | |
|---|---|---|---|
| 3,018,518 | 1/1962 | Jefferys | 156/415 UX |
| 3,121,651 | 2/1964 | Borglin et al. | 156/398 |
| 3,121,652 | 2/1964 | Borglin et al. | 156/400 |
| 3,237,199 | 2/1966 | Brey | 156/398 |
| 3,418,192 | 12/1968 | Nadler | 156/401 |
| 3,442,747 | 5/1969 | Brey | 156/417 |
| 3,536,566 | 10/1970 | Frazier et al. | 156/415 |
| 3,607,558 | 9/1971 | Nebout | 156/415 |
| 3,645,826 | 2/1972 | Henley et al. | 156/416 |
| 3,674,604 | 7/1972 | Gazuit | 156/415 |
| 3,795,564 | 3/1974 | Mallory | 156/417 |
| 3,868,203 | 2/1975 | Turk | 156/417 X |
| 4,007,081 | 2/1977 | Mallory | 156/417 |
| 4,045,277 | 8/1977 | Habert et al. | 156/417 |

Primary Examiner—John E. Kittle

[57] ABSTRACT

An expandable tire building drum is provided with hinged drum shoulder segments that present, when the drum is in its expanded position, a bevelled shoulder contour for supporting the thickened portion of the tire band next to the bead. This bevelled contour results in a greater radius of curvature for the thickened tire portion that extends around the drum shoulder, which makes it easier to pass a stitcher wheel over this portion of the tire, and to achieve a more uniform layering of the tire components next to the bead of the tire. When the drum is in its retracted position, the hinged drum shoulder segments are lifted to positions wherein they provide support for the carcass plies of the tire when they are first laid across the drum segments and the bead turnover bladders.

4 Claims, 5 Drawing Figures

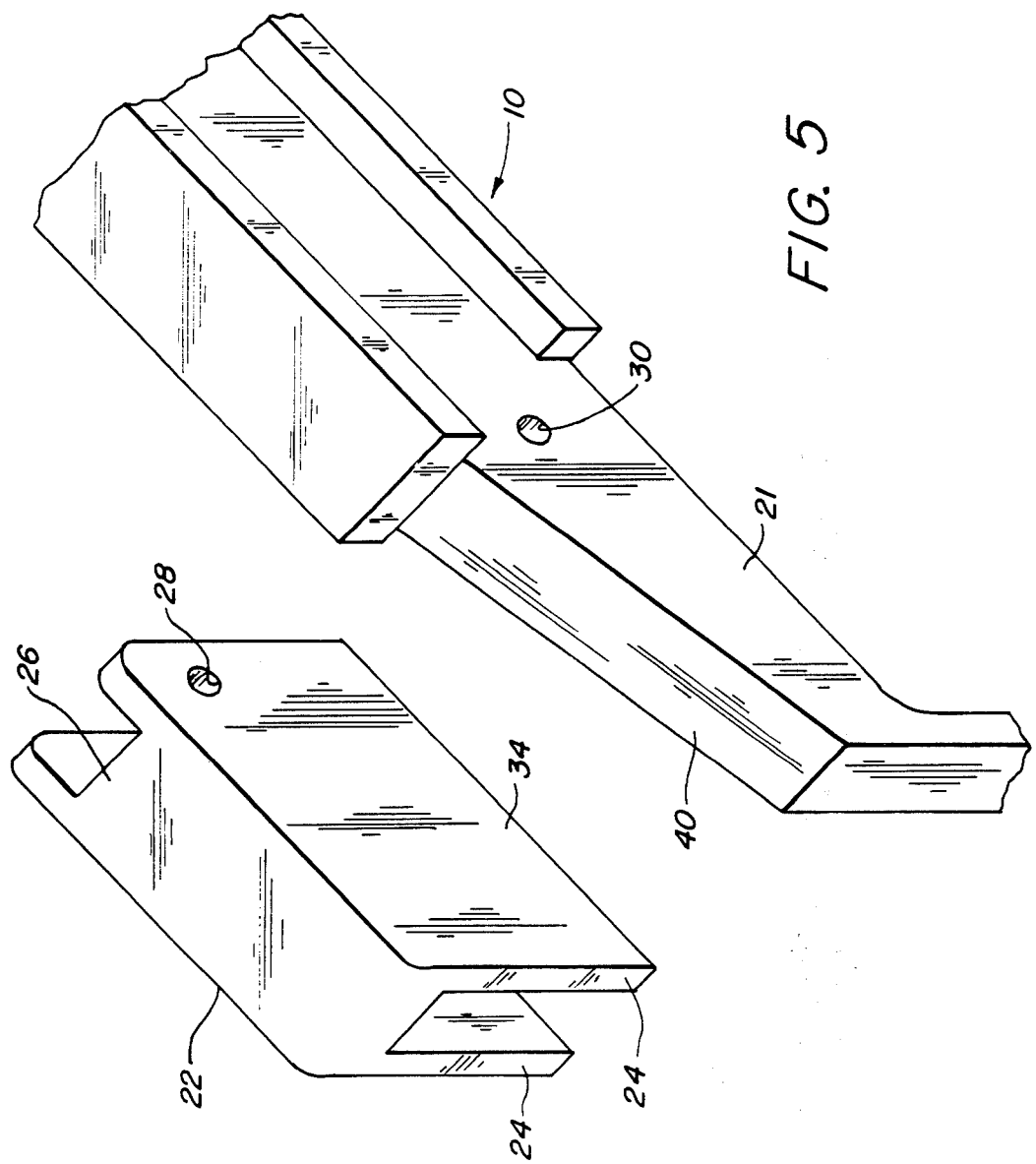

4,149,927

TIRE BUILDING APPARATUS WITH IMPROVED DRUM SHOULDER

FIELD OF THE INVENTION

This invention relates to tire building apparatus, and more particularly to expandable tire building drums such as are used in the building of radial tires. The invention comprises an improvement in the shoulder portion of such building drums.

BACKGROUND OF THE INVENTION

In the building of large, radial truck tires, the portions of the tire band next to the beads tend to be extremely thick. This is due to the large size of the beads and consequently the large size of the bead fillers that must be placed next to the beads, as well as the many carcass plies and ply ends that surround the bead fillers.

Since the beads are formed on a green tire band in such a manner that they hang along the sides of the drum, the thickened areas of the tire band next to the bead, namely the bead filler portions, must extend around the edges where the sides of the drum meet its cylindrical surface. While these edges are rounded, their radii of curvature are too small for the bead filler portions of many large truck tires to wrap around them, without losing contact with the building drum in some locations. It is thus difficult to run a stitcher wheel over the plies in these thick bead filler areas, because they are not in firm contact with the surfaces of the building drum. Often, because of this difficulty, the stitcher wheel will not stitch the plies evenly, and there will not be a uniform layering of the tire components around the bead fillers of the finished tire.

The improved drum shoulder construction of this invention is designed to solve the problem of such thick bead filler portions not laying in firm contact with the drum during the stitching operation. On the shoulder portions of the drum segments there are provided hinged shoulder segments that drop radially inwardly to present a bevelled drum contour for supporting the bead filler portions when the drum segments are in their expanded positions. When the drum segments are moved to their retracted positions, the hinged shoulder segments are lifted to positions wherein they provide firm support for the tire carcass plies in the interval between the drum segments and the bead turnover bladders.

Hinged members on tire building drums per se are not new. The segments of expandable tire building drums have been hinged at either end to provide downwardly depending supports for the sidewalls of the tire when the drum is expanded. Such hinged supports are shown in U.S. Pat. Nos. 3,536,566 and 3,607,558. However, these supports are hinged where the tread and sidewall sections come together, rather than at the bead filler part of the tire. Also, when the supports rotate about their hinges upon expansion of the drum, the beads and bead filler portions of the tire separate from the ends of the supports and are allowed to hang freely from these ends. These supports thus provide no support whatsoever for the bead filler portion of the tire when the drum is expanded.

U.S. Pat. Nos. 3,674,604 and 3,795,564 show expandable tire building drums with hinged members located adjacent the bead portions of the tire. However, the hinged members of these drums are all parts of mechanical linkages used to expand tire building drums. In no case do they provide a bevelled corner for supporting the bead filler part of the tire about a larger radius when the tire is expanded, and their constructions and movements are completely different from those of the shoulder segments of the present invention.

Hinged members have also been employed adjacent the shoulder portions of tire drums to assist in wrapping the carcass plies around the beads of the tire, as shown in U.S. Pat. Nos. 3,237,199; 3,418,192; and 3,442,747. However, these members are positioned externally of the bead portions of the tire after the plies have been folded over the bead rings and such hinged members provide no support for the tire band upon the expansion of the drum.

Other publications that are of possible interest in showing past uses of hinged members are U.S. Pat. Nos. 3,018,518; 3,121,651; 3,121,652; 3,868,203; and 4,007,081.

SUMMARY OF THE INVENTION

The present invention provides a tire building drum having an improved shoulder construction that supports the bead filler portion of the tire band on a bevelled edge when the drum is expanded. This bevelled edge allows the bead filler portion to bend on a large radius of curvature and still maintain firm contact with the drum, particularly when the stitcher wheel passes over it.

The improvement of this invention comprises a shoulder segment hinged by a pivot connection to each shoulder portion of each segment of the expandable drum. The shoulder segment has a radially outwardly facing surface that in a raised position of the shoulder segment is level with the radially outwardly facing tire support surface of the drum segment. The shoulder segment also has first and second abutments that face generally radially inwardly toward the hub of the building drum.

The building drum has associated with each shoulder segment a first shoulder segment support fixed with respect to the hub of the building drum. This first shoulder segment support engages the first abutment on the shoulder segment when the drum segment is in a retracted position, so as to maintain the shoulder segment in its raised position.

The shoulder portion of the drum segment has a second shoulder segment support that engages the second abutment on the shoulder segment when the drum segment is in an expanded position, so as to maintain the shoulder segment in a lowered position. In this lowered position, the outwardly facing surface of the shoulder segment forms a bevelled corner on the drum segment that supports the bead filler portion of the tire so that it is bent about a large radius of curvature and is still in a uniform, firm contact with the building drum.

These and other features, objects, and advantages of the present invention will be more apparent from the following detailed description and attached drawings.

DESCRIPTION OF THE DRAWINGS

In the attached drawings:

FIG. 5 is an enlarged perspective view of the shoulder portion of the drum segment of FIGS. 1 through 4 and an enlarged perspective view of a shoulder segment that has been removed from this shoulder portion.

DESCRIPTION OF A PREFERRED EMBODIMENT

Figure 1:
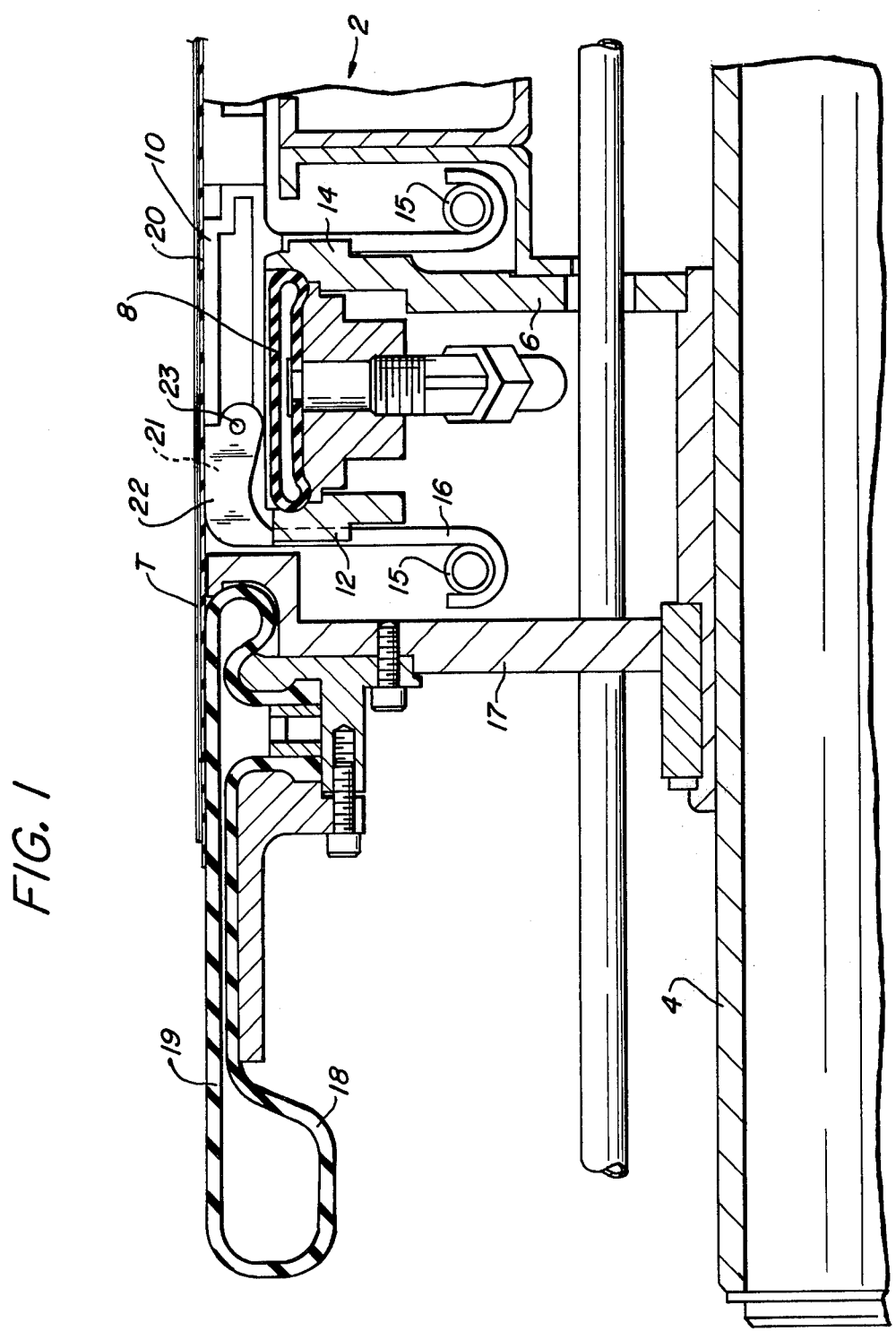
FIG. 1 is a partial axial sectional view of an expandable tire building drum having an improved shoulder construction that embodies the present invention, showing one segment of the drum in its retracted position.

FIG. 1 shows a portion of an expandable tire building drum 2 having a hub 4. Mounted on the hub 4 are a plurality of bladder support members 6 each supporting a bladder 8. Drum segments 10 are positioned over the bladders 8 and are spaced circumferentially around the hub 4. In its retracted position shown in FIG. 1, each of the drum segments 10 is held against support flanges 12 and 14 of support members 6 by circumferentially extending springs 15 seated in hooks 16 extending radially inwardly from the drum segment 10.

Also mounted on each end of the hub 4 is a flange 17 that supports a bead turnover bladder 18. Radially outwardly facing surface 19 of the turnover bladder 18 and a radially outwardly facing tire support surface 20 of the drum segment 10 are aligned with each other, and tire carcass plies T are laid across the surfaces 19 and 20.

Figure 2:
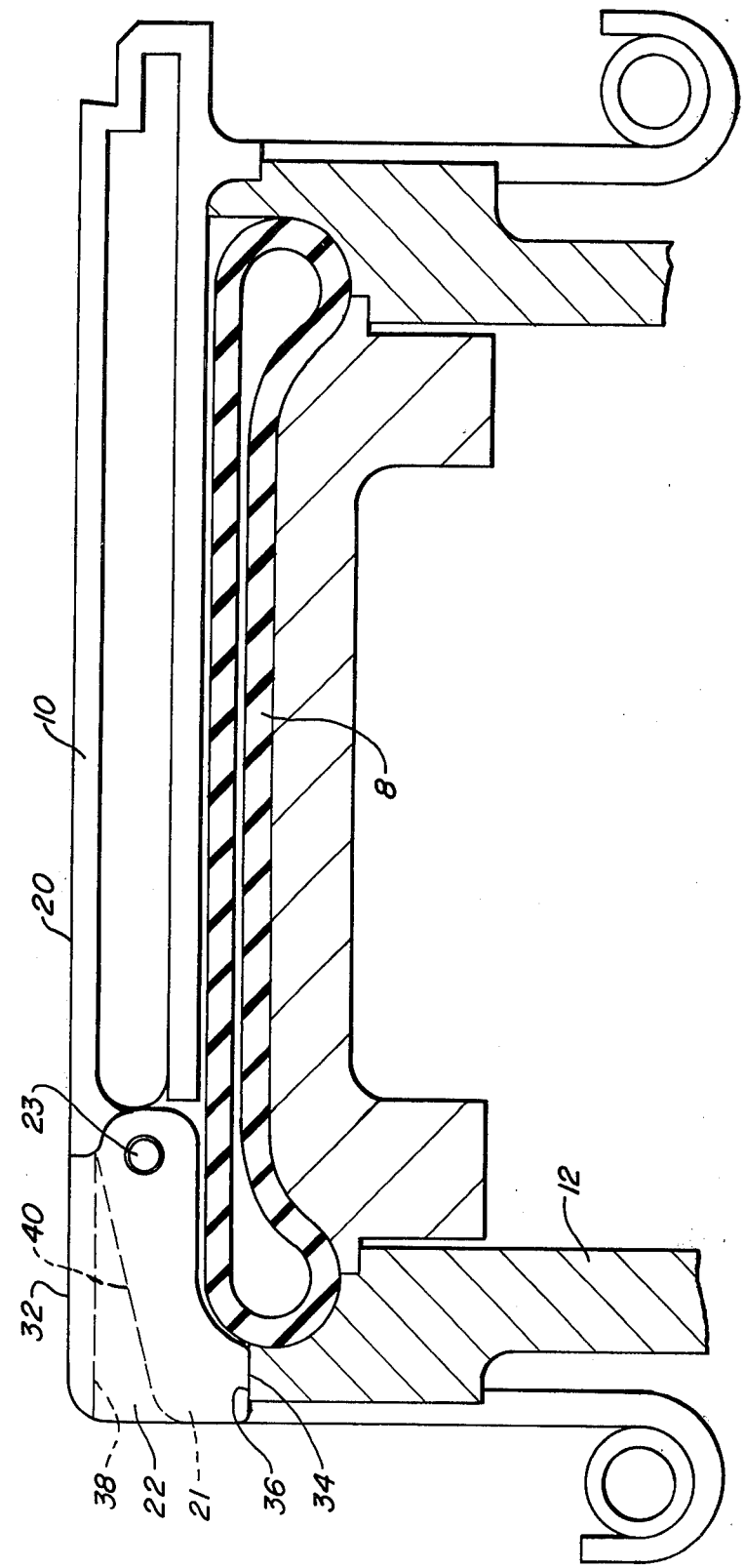
FIG. 2 is an enlarged axial sectional view of the shoulder area of the tire building drum of FIG. 1.

In accordance with the present invention, each drum segment 10 has a shoulder portion 21, best seen in the enlarged view of FIG. 2 and the perspective view of FIG. 5. A shoulder segment 22 is hinged to the shoulder portion 21 by means of a pivot pin 23. As seen in FIG. 5, the shoulder segment 22 is U-shaped and has leg sections 24 joined by a bridge section 26. The pivot pin 23 extends through holes 28 in leg sections 24 and hole 30 in shoulder portion 21.

The bridge section 26 of the shoulder segment 22 has a radially outwardly facing surface 32. When the shoulder segment 22 is in its raised position, shown in FIGS. 1 and 2, its surface 32 is level with the tire support surface 20 of the drum segment 10. In this position, the surface 32 gives firm support to the tire carcass plies T in the interval between the tire support surface 20 and the outwardly facing surface 19 of the turnover bladder 18. As seen most clearly in FIG. 2, the shoulder segment 22 is held in this raised position by abutments 34 on the ends of leg sections 24 engaging a shoulder segment support 36 on the flange 12 of bladder support member 6.

Figure 3:
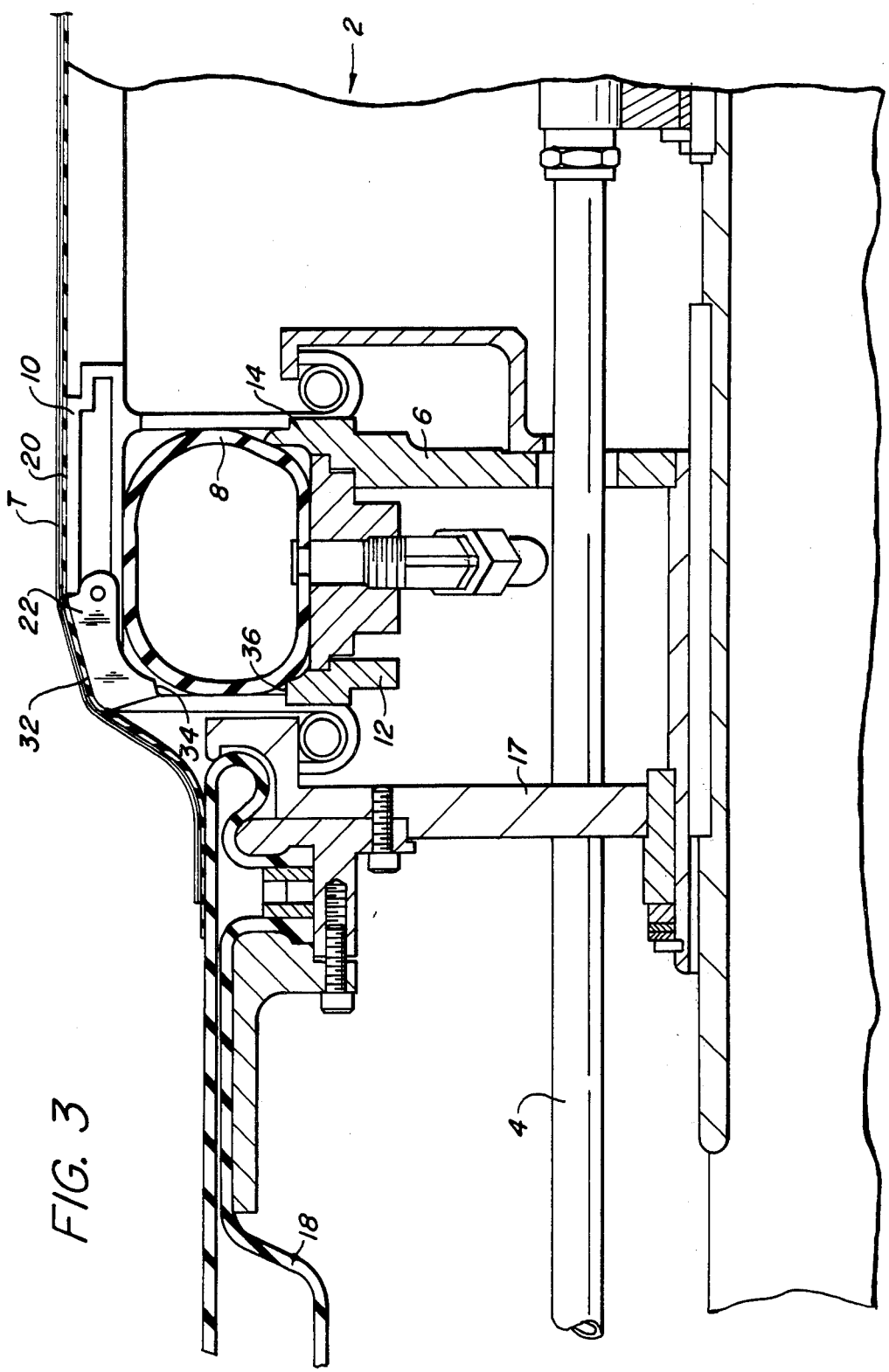
FIG. 3 is a partial axial sectional view of the tire building drum of FIG. 1, showing one segment of the drum in an expanded position before the bead and bead filler portions are formed on a tire band being built on the drum.

As shown in dotted lines in FIG. 2, the radially inward side of bridge section 26 of shoulder segment 22 forms a second abutment 38 that is designed for engagement with a second shoulder segment support 40 on the shoulder portion 21. In the raised position of the shoulder segment 22 in FIG. 2, the abutment 38 is lifted out of engagement with the support 40 by the engagement of the first abutment 34 with the first shoulder segment support 36. However, when the drum segment 10 is moved to its expanded position by inflation of the bladder 8, as shown in FIG. 3, the first abutment 34 is lifted off the shoulder segment support 36. This causes the shoulder segment 22, under pressure from the overlying tire carcass plies T, to drop to a lowered position in which the second abutment 38 on the underneath side of bridge section 26 rests on the second shoulder segment support 40. In this position, the outwardly facing surface 32 of the shoulder segment 22 forms a bevelled corner on the drum segment 10.

Figure 4:
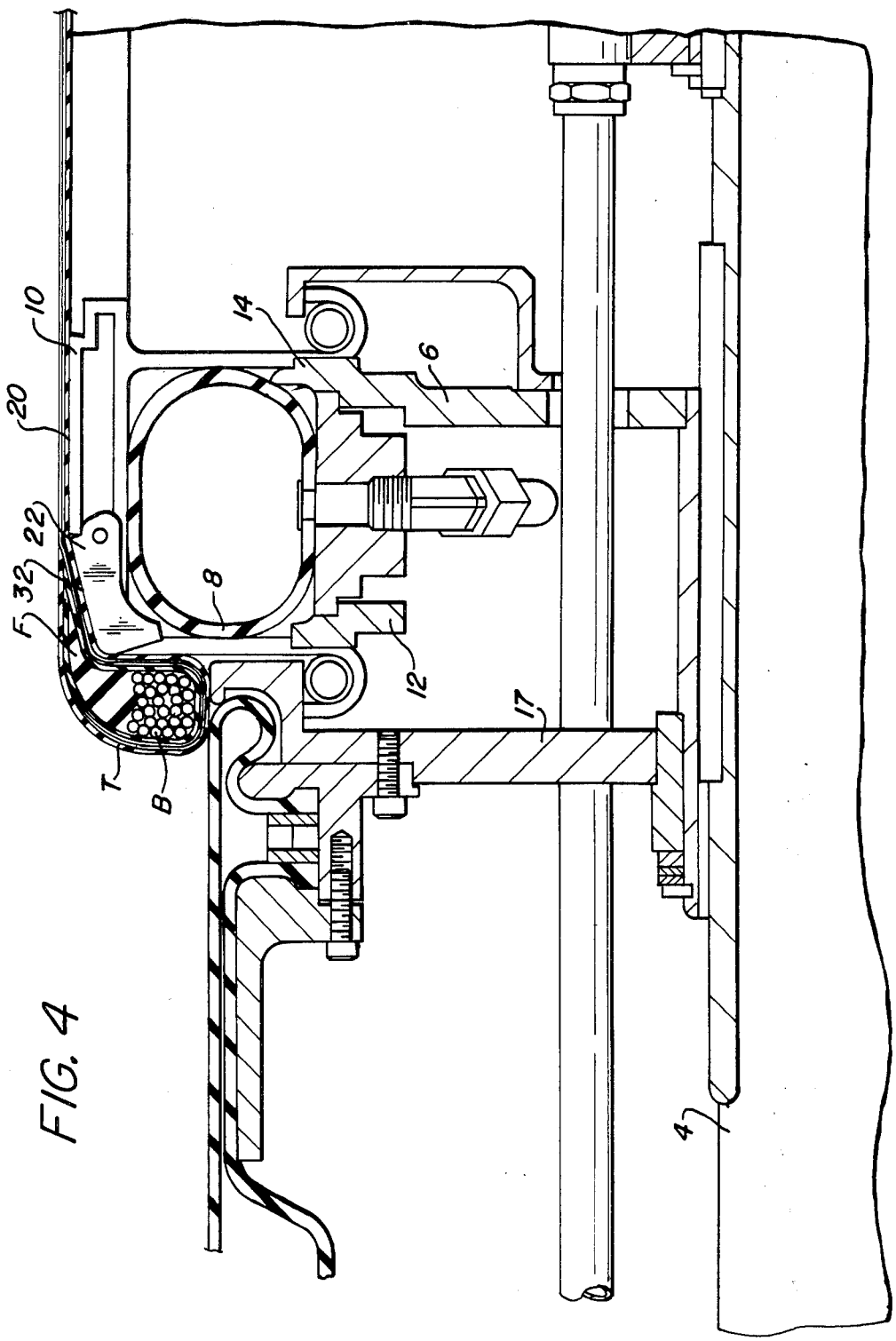
FIG. 4 is a partial axial sectional view of the tire building drum of FIG. 1, showing one segment of the drum in an expanded position after the bead and bead filler portion are formed on a tire band being built on the drum.

FIG. 4 shows the apparatus of FIG. 3 after the bead turnover bladder 18 has wrapped the tire carcass plies T around a bead B and adjacent bead filler F. It can be seen in FIG. 4 that the bevelled contour presented by the surface 32 of shoulder segment 22 has the advantage of allowing a larger radius of curvature for the bead filler F and adjacent carcass plies as they turn the corner around the shoulder of the building drum 2. This advantage is very significant for larger sizes of truck tires, where the bead fillers are thick and are surrounded by a large number of carcass plies. The shoulder segment 22 also provides a firm support for the bead filler F and the adjacent carcass plies T and allows them to lie flat on all parts of the surface of the building drum. Thus, when a stitcher wheel passes over the bead filler portion of the tire carcass, the stitching will be more uniform and there will be a more uniform layering of the carcass plies adjacent the bead and the bead filler of the tire.

The foregoing represents one embodiment of the present invention. Modifications and other embodiments within the scope of the appended claims will of course be apparent to those skilled in the art.

What is claimed is:

1. An expandable tire building drum having drum segments that have radially outwardly facing tire support surfaces and are each movable radially with respect to the hub of said drum between a retracted position and an expanded position, said drum segments also having shoulder portions adjacent to which are to be formed the bead filler portions of tires to be built on said building drum, wherein the improvement comprises:

a shoulder segment hinged by a pivot connection to each of the shoulder portions of said drum segments, said shoulder segment being rotatable about said pivot connection between a raised position and a lowered position, said shoulder segment having a radially outwardly facing surface that in the raised position of said shoulder segment is level with the radially outwardly facing tire support surface of the drum segment to which the shoulder segment is hinged, said shoulder segment also having first and second abutments that face generally radially inwardly toward said hub of said drum, said drum having for each said shoulder segment a first shoulder segment fixed with respect to said hub, said first shoulder segment support engaging said first abutment on said shoulder segment when said drum segment is in said retracted position so as to maintain said shoulder segment in said raised position, said shoulder portion of said drum segment having a second shoulder segment support that engages said second abutment on said shoulder segment when said drum segment is in said expanded position so as to maintain said shoulder segment in said lowered position wherein said outwardly facing surface forms a bevelled corner on said drum segment for supporting the bead filler portion of a tire to the built on said building drum.

2. The tire building drum according to claim 1, wherein said hinged shoulder segment is U-shaped and has two leg sections disposed on opposite sides of said shoulder portion of said drum segment and a bridge section connecting the radially outward portions of said leg portions to form said U-shape, said radially outwardly facing surface of said shoulder segment being on the radially outward side of said bridging section and said second abutment being on the radially inward side of said bridging section, and wherein said shoulder portion disposed between said leg sections of said shoulder segment has a bevelled surface forming said second shoulder segment support.

3. The tire building apparatus according to claim 2 wherein said leg portions of said U-shaped shoulder section have axially aligned pivot holes and said shoulder portion of said drum segment has a pivot hole aligned with said axially aligned pivot holes in said leg portions, and said pivot connection includes a pin extending through all of said pivot holes.

4. The tire building apparatus according to claim 1, 2, or 3, wherein said first abutment on each of said shoulder segments is on a radially inwardly extending edge of at least one of said leg portions and said drum has radially extending bladder support members mounted on said hub and drum expanding bladders mounted on said bladder support members beneath said shoulder portions of said drum segments, said first shoulder segment supports being mounted on said bladder support members adjacent said drum expanding bladders.

* * * * *

UNITED STATES PATENT AND TRADEMARK OFFICE
CERTIFICATE OF CORRECTION

PATENT NO. : 4,149,927
DATED : April 17, 1979
INVENTOR(S) : Walter William Lauer, Jr.

It is certified that error appears in the above–identified patent and that said Letters Patent are hereby corrected as shown below:

Column 4, line 53, which reads: "shoulder segment fixed with" should read ---shoulder segment support fixed with---.

Column 4, line 66, which reads: "portion of a tire to the" should read ---portion of a tire to be---.

Signed and Sealed this

Twenty-fourth Day of July 1979

[SEAL]

*Attest:*

LUTRELLE F. PARKER
*Attesting Officer*     *Acting Commissioner of Patents and Trademarks*